US012753277B2

(12) United States Patent
Jeong et al.

(10) Patent No.: US 12,753,277 B2
(45) Date of Patent: Oct. 6, 2026

(54) POLYCARBONATE, AND METHOD FOR PREPARING SAME

(71) Applicant: LG CHEM, LTD., Seoul (KR)

(72) Inventors: Jaemyeng Jeong, Daejeon (KR); Hoyong Lee, Daejeon (KR); Cheol Jun Song, Daejeon (KR); Bethy Kim, Daejeon (KR); Seoyoung Im, Daejeon (KR); Hanbit Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 642 days.

(21) Appl. No.: 18/273,518

(22) PCT Filed: Jan. 7, 2022

(86) PCT No.: PCT/KR2022/000318
§ 371 (c)(1),
(2) Date: Jul. 20, 2023

(87) PCT Pub. No.: WO2022/164074
PCT Pub. Date: Aug. 4, 2022

(65) Prior Publication Data

US 2024/0101758 A1 Mar. 28, 2024

(30) Foreign Application Priority Data

Jan. 28, 2021 (KR) ........................ 10-2021-0012478

(51) Int. Cl.
*C08G 64/16* (2006.01)
*C08G 64/30* (2006.01)

(52) U.S. Cl.
CPC ....... *C08G 64/1608* (2013.01); *C08G 64/305* (2013.01)

(58) Field of Classification Search
CPC ............................ C08G 64/1608; C08G 8/305
See application file for complete search history.

(56) References Cited

U.S. PATENT DOCUMENTS

| | | | | |
|---|---|---|---|---|
| 7,491,346 | B2 | 2/2009 | Hikosaka | |
| 8,877,341 | B2 | 11/2014 | Kato et al. | |
| 9,018,338 | B2 | 4/2015 | Motoyoshi | |
| 2010/0120993 | A1 | 5/2010 | Chatterjee et al. | |
| 2011/0160408 | A1 | 6/2011 | de Brouwer et al. | |
| 2012/0016100 | A1* | 1/2012 | Miyake .............. | C08G 64/0208 528/370 |
| 2012/0149863 | A1 | 6/2012 | Morizur | |
| 2013/0085254 | A1 | 4/2013 | Namiki et al. | |
| 2015/0087804 | A1 | 3/2015 | Motoyoshi | |
| 2015/0183929 | A1 | 7/2015 | Marshall et al. | |
| 2020/0224025 | A1 | 7/2020 | Hirakawa et al. | |
| 2021/0054143 | A1* | 2/2021 | Shiratake ........... | C08G 64/0208 |
| 2021/0230360 | A1 | 7/2021 | Son et al. | |
| 2021/0253788 | A1 | 8/2021 | Namiki et al. | |
| 2021/0332185 | A1 | 10/2021 | Hwang et al. | |
| 2022/0185959 | A1 | 6/2022 | Inagaki | |

FOREIGN PATENT DOCUMENTS

| | | | | |
|---|---|---|---|---|
| CN | 101889040 | A | 11/2010 | |
| CN | 112119109 | A | 12/2020 | |
| CN | 112262178 | A | 1/2021 | |
| EP | 2799463 | A1 | 11/2014 | |
| JP | 2012007160 | A | 1/2012 | |
| JP | 2013515841 | A | 5/2013 | |
| KR | 10-1206650 | B1 | 11/2012 | |
| KR | 10-2015-0004085 | A | 1/2015 | |
| KR | 10-1501783 | B1 | 3/2015 | |
| KR | 10-1593297 | B1 | 2/2016 | |
| KR | 10-1611705 | B1 | 4/2016 | |
| KR | 10-1800055 | B1 | 11/2017 | |
| KR | 10-2013975 | B1 | 8/2019 | |
| KR | 10-2019-0127664 | A | 11/2019 | |
| KR | 10-2199921 | B1 | 1/2021 | |
| TW | 202030173 | A | 8/2020 | |
| WO | 2011-082103 | A1 | 7/2011 | |
| WO | 2014-054940 | A2 | 4/2014 | |
| WO | WO-2019188114 | A1 * | 10/2019 | ......... C08G 64/0208 |
| WO | 2020-203444 | A1 | 10/2020 | |

* cited by examiner

*Primary Examiner* — Gregory Listvoyb
(74) *Attorney, Agent, or Firm* — BRYAN CAVE LEIGHTON PAISNER LLP

(57) ABSTRACT

The present application relates to a polycarbonate including a unit represented by Chemical Formula 1a; and a unit represented by Chemical Formula 1b, a composition including the same and a molded article prepared from the composition.

14 Claims, No Drawings

POLYCARBONATE, AND METHOD FOR PREPARING SAME

The present application is a National Phase entry pursuant to 35 U.S.C. § 371 of International Application No. PCT/KR2022/000318 filed on Jan. 7, 2022, and claims priority to and the benefit of Korean Patent No. 10-2021-0012478 filed in the Korean Intellectual Property Office on Jan. 28, 2021, the entire contents of which are incorporated herein by reference.

FIELD

The present invention relates to a polycarbonate and a preparation method thereof. More specifically, the present invention relates to a polycarbonate having high hardness and/or heat resistance, and a preparation method thereof.

BACKGROUND

A polycarbonate resin is a polymer material which has been used in various fields such as exterior materials of electrical and electronic products, automobile parts, construction materials, and optical parts.

Polycarbonate is a material extracted from bisphenol A petroleum and has a problem in that in order to increase the hardness, additional processes such as hard coating and costs are required, and the durability is reduced.

Therefore, there is a need for the development of a polycarbonate with improved durability while maintaining excellent physical properties of the polycarbonate itself.

SUMMARY

An exemplary embodiment of the present invention has been made in an effort to provide a polycarbonate having a novel structure, and a preparation method thereof.

Another exemplary embodiment of the present invention has been made in an effort to provide a composition including a polycarbonate having a novel structure, and a molded article prepared from the composition.

An exemplary embodiment of the present invention provides a polycarbonate including a unit represented by the following Chemical Formula 1a; and a unit represented by the following Chemical Formula 1b.

[Chemical Formula 1a]

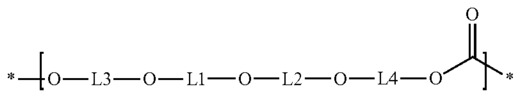

[Chemical Formula 1b]

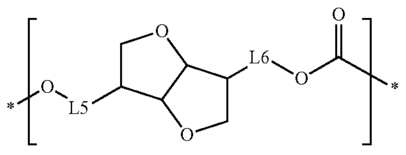

In Chemical Formulae 1a and 1b,

A is a substituted or unsubstituted phenylene; or an arylene in which two or more substituted or unsubstituted benzene rings are linked by a single bond or condensed, L1 and L2 are the same as or different from each other, and are each a substituted or unsubstituted straight-chained or branched alkylene, L3 and L4 are the same as or different from each other, and are each one selected from a substituted or unsubstituted straight-chained or branched alkylene, a substituted or unsubstituted cycloalkylene and a substituted or unsubstituted arylene, or a divalent group in which two or more of them are linked by a single bond, L5 and L6 are the same as or different from each other, and are each a single bond; or one selected from a substituted or unsubstituted straight-chained or branched alkylene, a substituted or unsubstituted cycloalkylene and a substituted or unsubstituted arylene, or a divalent group in which two or more of them are linked by a single bond, units of Chemical Formula 1a included in the polycarbonate are the same as or different from each other, units of Chemical Formula 1b included in the polycarbonate are the same as or different from each other, and

* means a site linked to the main chain of the polycarbonate.

An exemplary embodiment of the present invention provides a method for preparing the polycarbonate according to the above-described exemplary embodiment, the method including: polymerizing a composition including a compound of the following Chemical Formula 11a, a compound of the following Chemical Formula 11b, and a carbonate precursor.

[Chemical Formula 11a]

HO—L3—O—L1—A—L2—O—L4—OH

[Chemical Formula 11b]

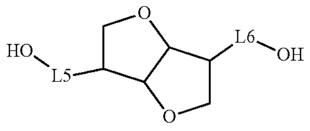

In Chemical Formulae 11a and 11b,

A is a substituted or unsubstituted phenylene; or an arylene in which two or more substituted or unsubstituted benzene rings are linked by a single bond or condensed, L1 and L2 are the same as or different from each other, and are each a substituted or unsubstituted straight-chained or branched alkylene, L3 and L4 are the same as or different from each other, and are each one selected from a substituted or unsubstituted straight-chained or branched alkylene, a substituted or unsubstituted cycloalkylene and a substituted or unsubstituted arylene, or a divalent group in which two or more of them are linked by a single bond, and L5 and L6 are the same as or different from each other, and are each a single bond; or one selected from a substituted or unsubstituted straight-chained or branched alkylene, a substituted or unsubstituted cycloalkylene and a substituted or unsubstituted arylene, or a divalent group in which two or more of them are linked by a single bond.

Another exemplary embodiment of the present invention provides a composition including the polycarbonate according to the above-described exemplary embodiment.

Still another exemplary embodiment of the present invention provides a molded article prepared from a composition including the polycarbonate according to the above-described exemplary embodiment.

The polycarbonate according to some exemplary embodiments of the present invention has a high hardness.

The polycarbonate according to some exemplary embodiments of the present invention has excellent heat resistance.

Therefore, by using a polycarbonate having high hardness or excellent heat resistance, the polycarbonate can be utilized in a wide range of fields such as lenses, glass, optical parts and vehicle parts that require excellent mechanical strength or heat resistance.

DETAILED DESCRIPTION

Hereinafter, specific exemplary embodiments will be described in more detail.

In the present specification, a cycloalkylene may be a monocyclic or polycyclic cycloalkylene. Specifically, the cycloalkylene may be a cycloalkylene having 3 to 20 carbon atoms; a monocyclic or polycyclic cycloalkylene having 6 to 18 carbon atoms; or a monocyclic or polycyclic cycloalkylene having 6 to 12 carbon atoms. More specifically, the cycloalkylene may be a divalent group derived from an alicyclic hydrocarbon such as cyclopentylene, cyclohexylene, or cycloheptylene as the monocyclic cycloalkylene, and may be adamantane-diyl, norbornane-diyl, and the like as the polycyclic cycloalkylene. However, the cycloalkylene is not limited thereto. Further, the cycloalkylene may be unsubstituted or substituted one or more with an alkyl group having 1 to 10 carbon atoms, an alkoxy having 1 to 10 carbon atoms, or a halogen.

In the present specification, the description on the cycloalkylene may be applied, except that cycloalkyl is a monovalent group rather than a divalent group.

In the present specification, a heterocycloalkylene may be a monocyclic or polycyclic heterocycloalkylene group including O, S, Se or N as a heteroatom. Specifically, the heterocycloalkylene may be a heterocycloalkylene having 1 to 20 carbon atoms; a monocyclic or polycyclic heterocycloalkylene having 2 to 18 carbon atoms; or a monocyclic or polycyclic heterocycloalkylene having 2 to 12 carbon atoms. More specifically, examples of the heterocycloalkylene include dioxanylene, dithianylene, and the like.

In the present specification, the description on the heterocycloalkylene may be applied, except that heterocycloalkyl is a monovalent group rather than a divalent group.

In the present specification, a straight-chained or branched alkylene may be a straight-chained or branched alkylene as a divalent group derived from an aliphatic hydrocarbon having 1 to 10, or 1 to 5 carbon atoms. Specific examples of the alkylene include methylene, ethylene, propylene, n-propylene, isopropylene, butylene, n-butylene, isobutylene, tert-butylene, sec-butylene, 1-methyl-butylene, 1-ethyl-butylene, pentylene, n-pentylene, isopentylene, neopentylene, tert-pentylene, hexylene, n-hexylene, 1-methylpentylene, 2-methylpentylene, 4-methyl-2-pentylene, 3,3-dimethylbutylene, 2-ethylbutylene, heptylene, n-heptylene, 1-methylhexylene, octylene, n-octylene, tert-octylene, 1-methylheptylene, 2-ethylhexylene, 2-propylpentylene, n-nonylene, 2,2-dimethylheptylene, 1-ethyl-propylene, 1,1-dimethyl-propylene, isohexylene, 2-methylpentylene, 4-methylhexylene, 5-methylhexylene, and the like, but are not limited thereto.

In the present specification, the description on the straight-chained or branched alkylene may be applied, except that a straight-chained or branched alkyl is a monovalent group rather than a divalent group.

In the present specification, the alkyl includes a straight-chained alkyl and a branched alkyl, unless otherwise limited.

In the present specification, an arylene may be a monocyclic or polycyclic arylene, and the number of carbon atoms thereof is not particularly limited, but is preferably 6 to 30, and may be 6 to 20. Specific examples of the monocyclic arylene include phenylene, biphenylylene, terphenylylene, and the like, but are not limited thereto. When the arylene is a polycyclic arylene, the number of carbon atoms thereof is not particularly limited, but is preferably 10 to 30, and may be 10 to 20. Specific examples of the polycyclic arylene include naphthylene, anthracenylene, phenanthrenylene, triphenylenylene, pyrenylene, phenalenylene, perylenylene, chrysenylene, fluorenylene, and the like, but are not limited thereto.

In the present specification, the description on the arylene may be applied, except that aryl is a monovalent group rather than a divalent group.

In the present specification, a heteroarylene includes one or more atoms other than carbon, that is, one or more heteroatoms, and specifically, the heteroatom includes one or more atoms selected from the group consisting of O, N, Se, S, and the like. The number of carbon atoms of the heteroarylene is not particularly limited, but is preferably 1 to 30, and may be 1 to 20. The heteroarylene may be monocyclic or polycyclic. Examples of the heteroarylene include a divalent thiophene group, a divalent furan group, a divalent pyrrole group, a divalent imidazole group, a divalent thiazole group, a divalent oxazole group, a divalent oxadiazole group, a divalent pyridine group, a divalent bipyridine group, a divalent pyrimidine group, a divalent triazine group, a divalent triazole group, a divalent acridine group, a divalent pyridazine group, a divalent pyrazine group, a divalent quinoline group, a divalent quinazoline group, a divalent quinoxaline group, a divalent phthalazine group, a divalent pyrido pyrimidine group, a divalent pyrido pyrazine group, a divalent pyrazino pyrazine group, a divalent isoquinoline group, a divalent indole group, a divalent carbazole group, and the like, but are not limited thereto.

In the present specification, the description on the heteroarylene may be applied, except that heteroaryl is a monovalent group rather than a divalent group.

In the present specification, a divalent aliphatic hydrocarbon group means the above-described straight-chained or branched alkylene, cycloalkylene, heterocycloalkylene, and the like.

In the present specification, an alkoxy may be an alkoxy group having 1 to 10, or 1 to 5 carbon atoms. Specific examples of the alkoxy group include methoxy, ethoxy, n-propoxy, isopropoxy, n-butoxy, isobutoxy, tert-butoxy, sec-butoxy, 1-methyl-butoxy, 1-ethyl-butoxy, pentoxy, or the like, but are not limited thereto.

In the present specification, a halogen is a fluoro, chloro, bromo, or iodo group.

In the present specification, the description on the above-described cycloalkylene or heterocycloalkylene may be applied to an aliphatic ring, and the description on the arylene or heteroarylene may be applied to an aromatic ring.

The term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present specification, the term “substituted or unsubstituted” means being substituted with one or more substituents selected from the group consisting of deuterium; a halogen; nitro ($NO_2$); nitrile (CN); haloalkyl; COOR; alkyl; cycloalkyl; heterocycloalkyl; alkoxy; aryl; and heteroaryl, being substituted with a substituent to which two or more substituents among the exemplified substituents are linked, or having no substituent. Here, R is alkyl, cycloalkyl, heterocycloalkyl, alkoxy, aryl or heteroaryl.

In the present specification, * means a binding site to another structure.

An exemplary embodiment of the present invention provides a polycarbonate including a unit represented by the following Chemical Formula 1a; and a unit represented by the following Chemical Formula 1b.

[Chemical Formula 1a]

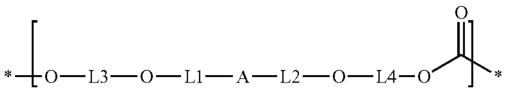

[Chemical Formula 1b]

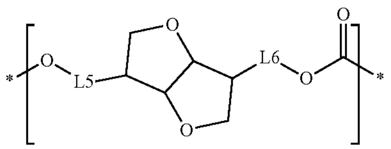

In Chemical Formulae 1a and 1b, the definition of each of the substituents A and L1-L6 are the same as that previously described herein.

Polycarbonate composed of an isosorbide group in the related art has advantages such as high heat resistance, high scratch resistance and transparency. However, the polycarbonate in the related art has a disadvantage of lower impact strength than a commercialized polycarbonate due to the rigidity of the monomer itself. In order to solve this problem, the present inventors have studied a method for improving the impact strength of polycarbonate by copolymerizing a monomer having a flexible property in addition to an isosorbide group.

By including the units represented by Chemical Formulae 1a and 1b of the present invention, the free volume of a polycarbonate chain may be reduced, thereby improving the heat resistance of the polycarbonate. Further, the segment rotation of the isosorbide group may be limited to exhibit an effect of improving the hardness of the polycarbonate.

According to an exemplary embodiment of the present invention, when the polycarbonate includes two or more units of Chemical Formula 1a, the units of Chemical Formula 1a are the same as or different from each other.

According to an exemplary embodiment of the present invention, when the polycarbonate includes two or more units of Chemical Formula 1b, the units of Chemical Formula 1b are the same as or different from each other.

According to an exemplary embodiment of the present invention, A of Chemical Formula 1a may be phenylene, biphenylene, or naphthylene.

According to an exemplary embodiment of the present invention, A of Chemical Formula 1a may be selected from the following structural formulae.

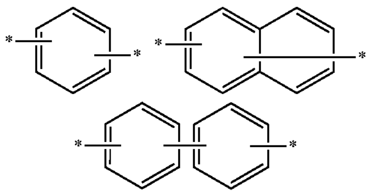

In the structural formulae, * means a binding position.

According to an exemplary embodiment of the present invention, A of Chemical Formula 1a may be selected from the following structural formulae.

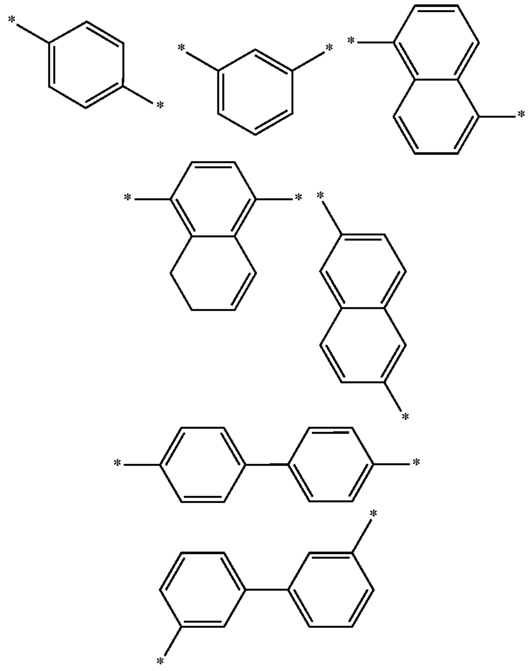

In the structural formulae, * means a binding position.

According to an exemplary embodiment of the present invention, L1 and L2 of Chemical Formula 1a are the same as or different from each other, and are each a straight-chained or branched alkylene.

According to an exemplary embodiment of the present invention, L1 and L2 of Chemical Formula 1a are the same as or different from each other, and are each a straight-chained or branched C1 to C20 alkylene.

According to an exemplary embodiment of the present invention, L1 and L2 of Chemical Formula 1a are the same as or different from each other, and are each a straight-chained C1 to C10 alkylene, preferably a straight-chained C1 to C5 alkylene.

According to an exemplary embodiment of the present invention, L1 and L2 of Chemical Formula 1a are the same as or different from each other, and are each methylene or ethylene.

According to an exemplary embodiment of the present invention, L1 and L2 of Chemical Formula 1a are the same as each other, and are methylene or ethylene.

According to an exemplary embodiment of the present invention, Chemical Formula 1a may be represented by the following Chemical Formula 1a-1.

[Chemical Formula 1a-1]

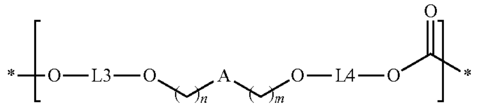

In Chemical Formula 1a-1, n and m are the same as or different from each other, and are each an integer from 1 to 20, and the definitions of the other substituents A, L2 and L3 are the same as those defined in Chemical Formula 1a.

According to an exemplary embodiment of the present invention, n and m of Chemical Formula 1a-1 are the same as or different from each other, and may be each an integer from 1 to 10, an integer from 1 to 5, or an integer from 1 to 3.

According to an exemplary embodiment of the present invention, L3 and L4 of Chemical Formula 1a are the same as or different from each other, and are each a straight-chained or branched alkylene, cycloalkylene, arylene, a straight-chained or branched alkylene-cycloalkylene, cycloalkylene-a straight-chained or branched alkylene, a straight-chained or branched alkylene-cycloalkylene-a straight-chained or branched alkylene, a straight-chained or branched alkylene-arylene, arylene-a straight-chained or branched alkylene, or a straight-chained or branched alkylene-arylene-a straight-chained or branched alkylene, and here, the straight-chained or branched alkylene, cycloalkylene and arylene are each unsubstituted or substituted with alkoxy, COOR, alkyl or aryl, wherein R is hydrogen, alkyl or aryl.

For example, cycloalkylene-a straight-chained or branched alkylene means a divalent group in which cycloalkylene and a straight-chained or branched alkylene are linked by a single bond.

According to an exemplary embodiment of the present invention, L3 and L4 of Chemical Formula 1a are the same as or different from each other, and are each arylene, a straight-chained or branched alkylene-arylene, arylene-a straight-chained or branched alkylene, or a straight-chained or branched alkylene-arylene-a straight-chained or branched alkylene.

For example, a straight-chained or branched alkylene-arylene-a straight-chained or branched alkylene means a divalent group in which a straight-chained or branched alkylene, arylene and a straight-chained or branched alkylene are linked by a single bond in this order.

According to an exemplary embodiment of the present invention, L3 and L4 of Chemical Formula 1a are the same as or different from each other, and are each arylene, a straight-chained or branched alkylene-arylene, arylene-a straight-chained or branched alkylene, or a straight-chained or branched alkylene-arylene-a straight-chained or branched alkylene, and here, the arylene is C6 to C20, and the straight-chained or branched alkylene is C1 to C6.

According to an exemplary embodiment of the present invention, L3 and L4 of Chemical Formula 1a are the same as or different from each other, and are each a C6 to C20 arylene, a C1 to C6 alkylene-a C6 to C20 arylene, or a C6 to C20 arylene-a C1 to C6 alkylene.

According to an exemplary embodiment of the present invention, L3 and L4 of Chemical Formula 1a are the same as or different from each other, and are each phenylene, alkylene-phenylene, or phenylene-alkylene, and here, the alkylene is methylene or ethylene.

According to an exemplary embodiment of the present invention, L3 of Chemical Formula 1a is alkylene-phenylene, L4 is phenylene-alkylene, and here, the alkylene is methylene or ethylene.

According to an exemplary embodiment of the present invention, Chemical Formula 1a may be represented by the following Chemical Formula 1a-2.

[Chemical Formula 1a-2]

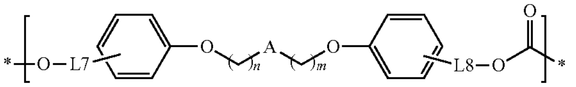

In Chemical Formula 1a-2,

L7 and L8 are the same as or different from each other, and are each a straight-chained or branched alkylene, and the definitions of A, n and m are the same as those defined in Chemical Formulae 1a and 1a-1.

According to an example, L7 and L8 are a C1 to C20 straight-chained or branched alkylene, specifically a C1 to C6 straight-chained alkylene, and for example, methylene or ethylene.

According to an exemplary embodiment of the present invention, L5 and L6 of Chemical Formula 1b are the same as or different from each other, and are each a single bond, or a straight-chained or branched alkylene.

According to an exemplary embodiment of the present invention, L5 and L6 of Chemical Formula 1b are the same as or different from each other, and are each a single bond, or a straight-chained or branched C1 to C6 alkylene.

According to an exemplary embodiment of the present invention, L5 and L6 of Chemical Formula 1b are the same as or different from each other, and are each a single bond, methylene, ethylene, propylene, or butylene.

According to an exemplary embodiment of the present invention, the polycarbonate may include the unit represented by Chemical Formula 1a in an amount of 10 wt % or more, preferably 15 wt % or more, more preferably 20 wt % or more and 50 wt % or less, 45 wt % or less, or 40 wt % or less, based on the total weight of the polycarbonate.

According to an exemplary embodiment of the present invention, the polycarbonate may include the unit represented by Chemical Formula 1b in an amount of 40 wt % or more, preferably 50 wt % or more, more preferably 60 wt % or more, and 90 wt % or less, for example, 85 wt % or less, or 70 wt % or less, based on the total weight of the polycarbonate.

In the present invention, the content of the structure included in the polycarbonate can be calculated by a typical method from the result after a nuclear magnetic resonance (NMR) analysis on the polycarbonate.

The weight average molecular weight (Mw) of the polycarbonate according to an exemplary embodiment of the invention may be appropriately adjusted according to the purpose and use, and the weight average molecular weight of the polycarbonate may be 30,000 g/mol or more, or 40,000 g/mol or more and 60,000 g/mol or less, or 55,000 g/mol or less, or 50,000 g/mol or less, considering that it is possible to exhibit improved weather resistance while maintaining excellent characteristics of the polycarbonate itself, such as transparency and impact strength.

Meanwhile, in the present invention, the weight average molecular weights (Mws) of the polycarbonate and the oligomer used in the preparation thereof may be measured by gel permeation chromatograph (GPC) using a polystyrene (PS) standard using Agilent 1200 series. Specifically, the weight average molecular weights may be measured using an Agilent 1200 series device using a Polymer Laboratories PLgel MIX-B 300 mm length column, and in this case, the measurement temperature is 160° C., the used solvent is 1,2,4-trichlorobenzene, and the flow rate is 1 mL/min. The sample of the polycarbonate or oligomer is each prepared at a concentration of 10 mg/10 mL, and then fed in an amount of 200 μL, and the Mw value is induced using a calibration curve formed using a polystyrene standard. In this case, nine types of polystyrene standard products with a molecular weight (g/mol) of 2,000/10,000/30,000/70,000/200,000/700,000/2,000,000/4,000,000/10,000,000 are used.

According to an exemplary embodiment of the present invention, the polycarbonate further includes a unit of the following Chemical Formula 2.

[Chemical Formula 2]

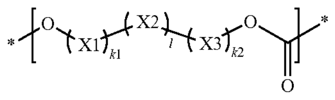

In Chemical Formula 2,

X1 and X3 are the same as or different from each other, and are each a substituted or unsubstituted divalent aliphatic hydrocarbon group, a substituted or unsubstituted divalent isosorbide group, a substituted or unsubstituted arylene, or a substituted or unsubstituted heteroarylene, X2 is a substituted or unsubstituted divalent aliphatic hydrocarbon group, a substituted or unsubstituted divalent isosorbide group, a substituted or unsubstituted arylene, a substituted or unsubstituted heteroarylene, O, S, SO, $SO_2$ or CO, k1 is 0 or 1, provided that when X2 directly bonded to X1 is O, S, SO, $SO_2$ or CO, k1 is 1, l is an integer from 1 to 5, and when l is 2 or higher, X2's are the same as or different from each other, k2 is 0 or 1, provided that when X2 directly bonded to X3 is O, S, SO, $SO_2$ or CO, k2 is 1, units of Chemical Formula 2 included in the polycarbonate are the same as or different from each other, and

* means a site linked to the main chain of the polycarbonate.

According to an exemplary embodiment of the present invention, when the polycarbonate includes two or more units of Chemical Formula 2, the units of Chemical Formula 2 are the same as or different from each other.

According to an exemplary embodiment of the present invention, the polycarbonate includes the unit represented by Chemical Formula 2 in an amount of 30 wt % or more, preferably 50 wt % or more, and more preferably 70 wt %, based on the total weight of the polycarbonate. The polycarbonate may include the unit represented by Chemical Formula 2 in an amount of 70 wt % or less, for example, 50 wt % or less.

According to an exemplary embodiment of the present invention, Chemical Formula 2 may be represented by one of the following Chemical Formulae 3 to 6.

[Chemical Formula 3]

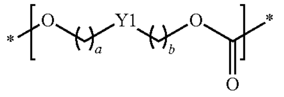

[Chemical Formula 4]

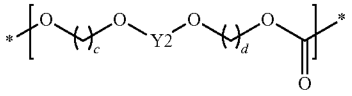

[Chemical Formula 5]

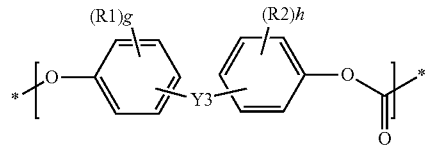

[Chemical Formula 6]

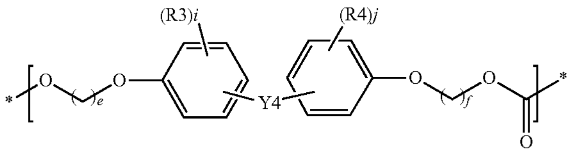

In Chemical Formulae 3 to 6,

Y1 and Y2 are each a substituted or unsubstituted divalent aliphatic hydrocarbon group, a substituted or unsubstituted divalent isosorbide group, a substituted or unsubstituted arylene, or a substituted or unsubstituted heteroarylene, Y3 and Y4 are each a substituted or unsubstituted straight-chained or branched alkylene, a substituted or unsubstituted cycloalkylene, a substituted or unsubstituted arylene, O, S, SO, $SO_2$ or CO, R1 to R4 are the same as or different from each other, and are each hydrogen, a halogen, a substituted or unsubstituted alkyl, or a substituted or unsubstituted alkoxy, a and b are each an integer from 0 to 4, c, d, e and f are each an integer from 1 to 4, g, h, i and j are each an integer from 0 to 4, when g, h, i and j are each 2 or higher, each R1 to R4 is the same as or different from each other, the units of Chemical Formulae 3 to 6 included in the polycarbonate are the same as or different from each other, and

* means a site linked to the main chain of the polycarbonate.

According to an exemplary embodiment of the present invention, when the polycarbonate each includes two or more units of Chemical Formulae 3 to 6, the units of Chemical Formulae 3 to 6 are the same as or different from each other.

According to an exemplary embodiment of the present invention, Y1 of Chemical Formula 3 may be a substituted or unsubstituted cycloalkylene, a substituted or unsubstituted heterocycloalkylene, a substituted or unsubstituted arylene, or a substituted or unsubstituted heteroarylene.

According to an exemplary embodiment of the present invention, Y1 of Chemical Formula 3 may be a substituted or unsubstituted cycloalkylene having 3 to 30 carbon atoms, a substituted or unsubstituted heterocycloalkylene having 2 to 30 carbon atoms, a substituted or unsubstituted arylene having 6 to 30 carbon atoms, or a substituted or unsubstituted heteroarylene having 2 to 30 carbon atoms.

According to an exemplary embodiment of the present invention, Y1 of Chemical Formula 3 may be a substituted or unsubstituted cycloalkylene having 3 to 15 carbon atoms, a substituted or unsubstituted heterocycloalkylene having 2 to 15 carbon atoms, a substituted or unsubstituted arylene having 6 to 15 carbon atoms, or a substituted or unsubstituted heteroarylene having 2 to 15 carbon atoms.

According to an exemplary embodiment of the present invention, Y1 of Chemical Formula 3 may be a substituted or unsubstituted cyclobutylene, a substituted or unsubstituted cyclopentylene, a substituted or unsubstituted cyclohexylene, a substituted or unsubstituted divalent tetrahydrofuran, a substituted or unsubstituted biphenylene, or a substituted or unsubstituted divalent furan.

According to an exemplary embodiment of the present invention, Y2 of Chemical Formula 4 may be a substituted or unsubstituted cycloalkylene, or a substituted or unsubstituted arylene.

According to an exemplary embodiment of the present invention, Y2 of Chemical Formula 4 may be a substituted or unsubstituted cycloalkylene having 3 to 30 carbon atoms, or a substituted or unsubstituted arylene having 6 to 30 carbon atoms.

According to an exemplary embodiment of the present invention, Y2 of Chemical Formula 4 may be a substituted or unsubstituted cycloalkylene having 3 to 15 carbon atoms, or a substituted or unsubstituted arylene having 6 to 15 carbon atoms.

According to an exemplary embodiment of the present invention, Y2 of Chemical Formula 4 may be a substituted or unsubstituted cyclobutylene, a substituted or unsubstituted cyclopentylene, a substituted or unsubstituted cyclohexylene, or a substituted or unsubstituted biphenylene.

According to an exemplary embodiment of the present invention, Y3 of Chemical Formula 5 may be a substituted or unsubstituted alkylene, a substituted or unsubstituted cycloalkylene, a substituted or unsubstituted arylene, or $SO_2$.

According to an exemplary embodiment of the present invention, Y3 of Chemical Formula 5 may be a substituted or unsubstituted alkylene having 1 to 30 carbon atoms, a substituted or unsubstituted cycloalkylene having 3 to 30 carbon atoms, a substituted or unsubstituted arylene having 6 to 30 carbon atoms, or $SO_2$.

According to an exemplary embodiment of the present invention, Y3 of Chemical Formula 5 may be a substituted or unsubstituted alkylene having 1 to 10 carbon atoms, a substituted or unsubstituted cycloalkylene having 3 to 15 carbon atoms, a substituted or unsubstituted arylene having 6 to 15 carbon atoms, or $SO_2$.

According to an exemplary embodiment of the present invention, Y3 of Chemical Formula 5 may be a substituted or unsubstituted straight-chained or branched alkylene having 1 to 5 carbon atoms, a substituted or unsubstituted cyclohexylene, a substituted or unsubstituted phenylene, or $SO_2$.

According to an exemplary embodiment of the present invention, Y4 of Chemical Formula 6 may be a substituted or unsubstituted alkylene, a substituted or unsubstituted cycloalkylene, a substituted or unsubstituted arylene, or $SO_2$.

According to an exemplary embodiment of the present invention, Y4 of Chemical Formula 6 may be a substituted or unsubstituted alkylene having 1 to 30 carbon atoms, a substituted or unsubstituted cycloalkylene having 3 to 30 carbon atoms, a substituted or unsubstituted arylene having 6 to 30 carbon atoms, or $SO_2$.

According to an exemplary embodiment of the present invention, Y4 of Chemical Formula 6 may be a substituted or unsubstituted alkylene having 1 to 10 carbon atoms, a substituted or unsubstituted cycloalkylene having 3 to 15 carbon atoms, a substituted or unsubstituted arylene having 6 to 15 carbon atoms, or $SO_2$.

According to an exemplary embodiment of the present invention, Y4 of Chemical Formula 6 may be a substituted or unsubstituted straight-chained or branched alkylene having 1 to 5 carbon atoms, a substituted or unsubstituted cyclohexylene, a substituted or unsubstituted phenylene, or $SO_2$.

According to an exemplary embodiment of the present invention, R1 to R4 of Chemical Formulae 5 and 6 may be hydrogen, or a substituted or unsubstituted alkyl having 1 to 10 carbon atoms.

According to an exemplary embodiment of the present invention, R1 to R4 of Chemical Formulae 5 and 6 may be hydrogen, or a substituted or unsubstituted alkyl having 1 to 5 carbon atoms.

According to an exemplary embodiment of the present invention, R1 to R4 of Chemical Formulae 5 and 6 may be hydrogen, or a substituted or unsubstituted methyl.

According to an exemplary embodiment of the present invention, R1 to R4 of Chemical Formulae 5 and 6 may be a substituted or unsubstituted alkyl having 1 to 10 carbon atoms.

According to an exemplary embodiment of the present invention, R1 to R4 of Chemical Formulae 5 and 6 may be a substituted or unsubstituted alkyl having 1 to 5 carbon atoms.

According to an exemplary embodiment of the present invention, R1 to R4 of Chemical Formulae 5 and 6 may be a substituted or unsubstituted methyl.

According to an exemplary embodiment of the present invention, Chemical Formula 3 may be represented by any one of the following units.

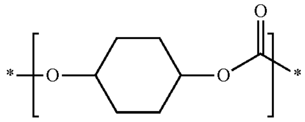

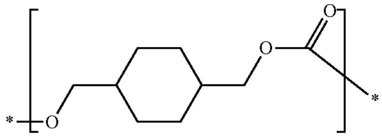

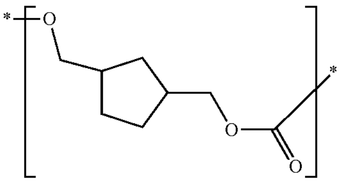

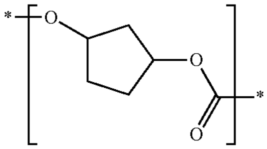

-continued

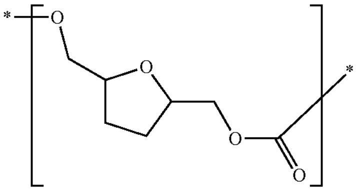

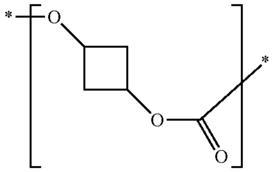

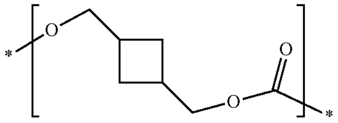

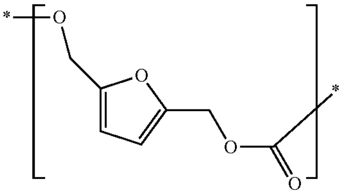

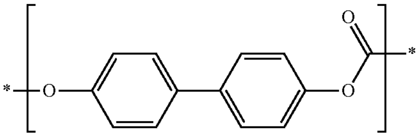

According to an exemplary embodiment of the present invention, Chemical Formula 4 may be represented by any one of the following units.

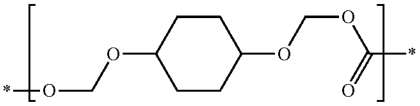

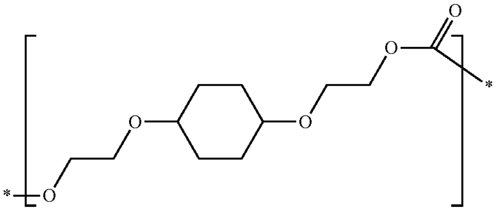

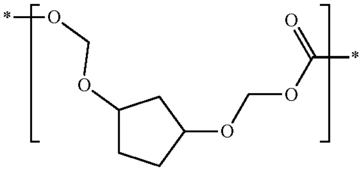

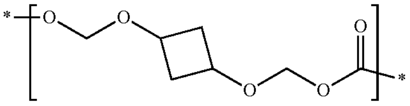

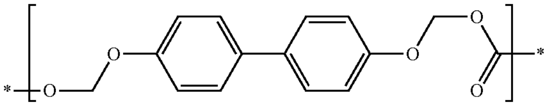

According to an exemplary embodiment of the present invention, Chemical Formula 5 may be represented by any one of the following units.

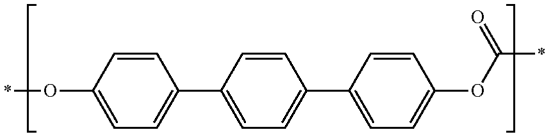

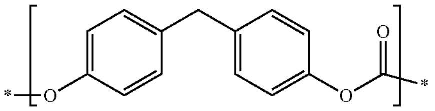

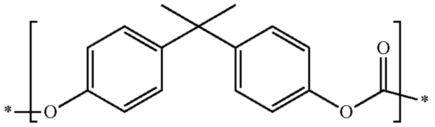

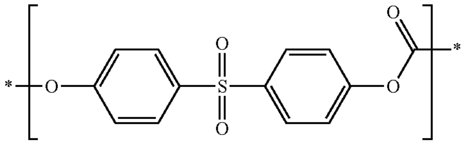

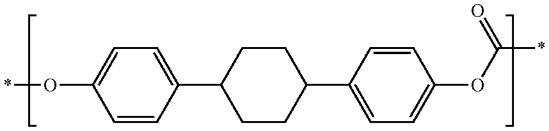

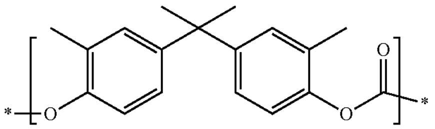

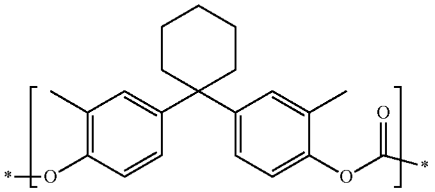

According to an exemplary embodiment of the present invention, Chemical Formula 6 may be represented by any one of the following units.

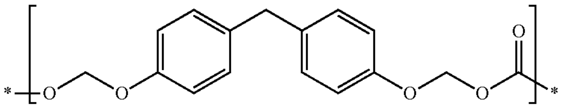

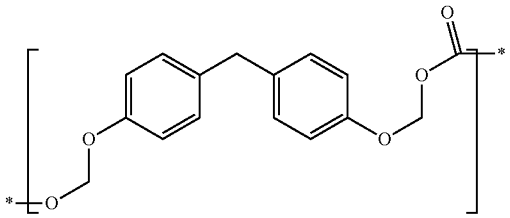

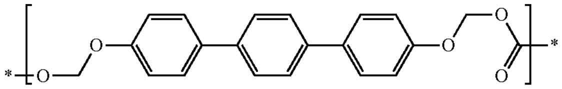

-continued

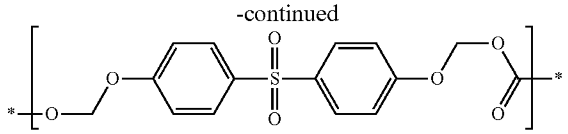

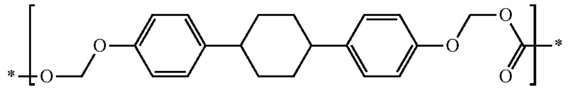

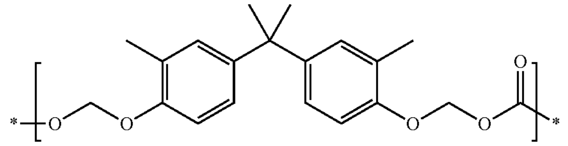

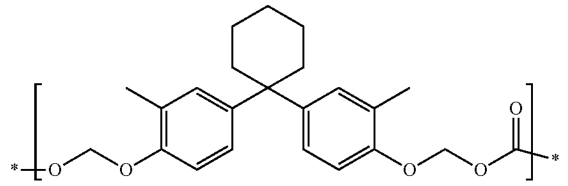

According to an exemplary embodiment of the present invention, the polycarbonate may have a hydroxyl group as an end group, but is not limited thereto.

According to an exemplary embodiment of the present invention, when the impact strength of the polycarbonate is measured at 23° C. in accordance with ASTM D256 (⅛ inch, Notched Izod), the impact strength may be 245 J/m or more, 250 J/m or more, or 280 J/m or more. The upper limit of the impact strength is not particularly limited, but may be, for example, 500 J/m or less, or 450 J/m or less.

Specifically, the Izod impact strength measurement method is a method using a pendulum with a predetermined weight, and the impact strength is obtained by dividing an absorption energy obtained as a returning height when a test specimen is hit by the pendulum and rotated by the cross-sectional area at the notch part of the test specimen.

According to an exemplary embodiment of the present invention, when the pencil hardness of the polycarbonate is measured at an angle of 45 degrees under a load of 50 g using a pencil hardness tester (Cometech) at a temperature of 23° C. and in accordance with ASTM D3363, the pencil hardness may be HB or more.

Another exemplary embodiment of the present invention provides a method for preparing a polycarbonate including a unit presented by the above-described Chemical Formula 1a; and a unit represented by Chemical Formula 1b, the method including: polymerizing a composition including a compound of the following Chemical Formula 11a, a compound of the following Chemical Formula 11b and a carbonate precursor.

[Chemical Formula 11a]

HO—L3—O—L1—A—L2—O—L4—OH

[Chemical Formula 11b]

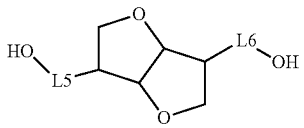

In Chemical Formulae 11a and 11b,

A is a substituted or unsubstituted phenylene; or an arylene in which two or more substituted or unsubstituted benzene rings are linked by a single bond or condensed, L1 and L2 are the same as or different from each other, and are each a substituted or unsubstituted straight-chained or branched alkylene, L3 and L4 are the same as or different from each other, and are each one selected from a substituted or unsubstituted straight-chained or branched alkylene, a substituted or unsubstituted cycloalkylene and a substituted or unsubstituted arylene, or a divalent group in which two or more of them are linked by a single bond, and L5 and L6 are the same as or different from each other, and are each a single bond; or one selected from a substituted or unsubstituted straight-chained or branched alkylene, a substituted or unsubstituted cycloalkylene and a substituted or unsubstituted arylene, or a divalent group in which two or more of them are linked by a single bond.

Preferred examples of the substituents of Chemical Formula 11a are the same as the description related to the above-described Chemical Formula 1a.

Preferred examples of the substituents of Chemical Formula 11b are the same as the description related to the above-described Chemical Formula 1b.

According to another exemplary embodiment of the present invention, Chemical Formula 11a may be represented by the following Chemical Formula 11a-1.

[Chemical Formula 11a-1]

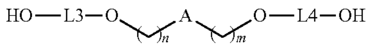

In Chemical Formula 11a-1, the definitions of the substituents A, L3, L4, n and M are the same as that in Chemical Formula 1a-1.

According to still another exemplary embodiment of the present invention, Chemical Formula 11a-1 may be represented by the following Chemical Formula 11a-2.

[Chemical Formula 11a-2]

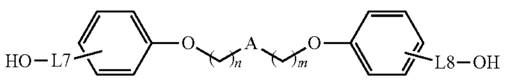

In Chemical Formula 11a-2, the definitions of the substituents A, L7, L8, n and m are the same as that in Chemical Formula 1a-2.

According to an exemplary embodiment of the present invention, the compound of Chemical Formula 11a may be represented by the following structures.

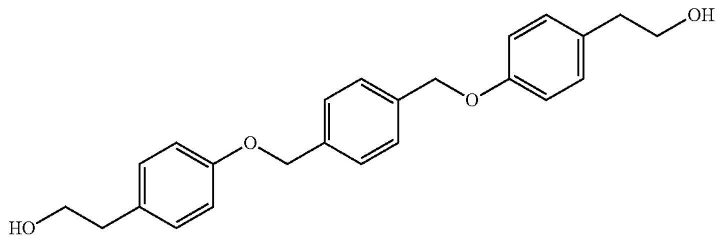
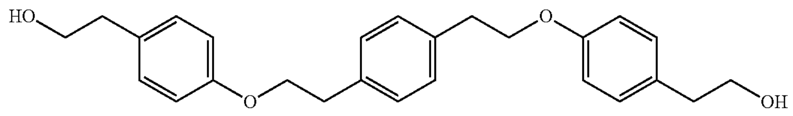
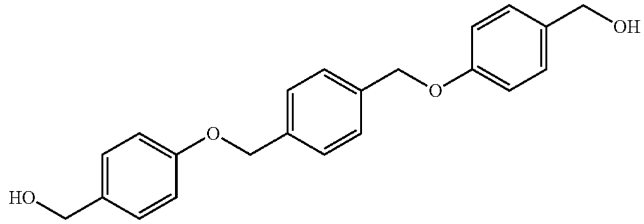
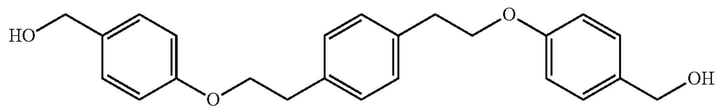
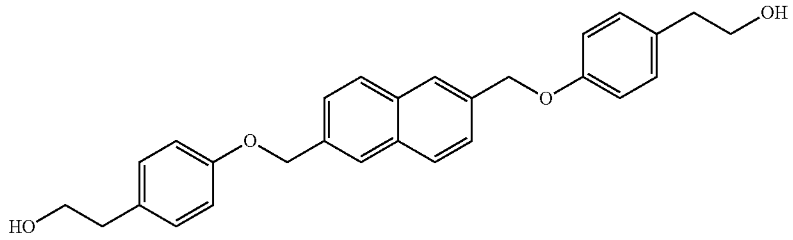
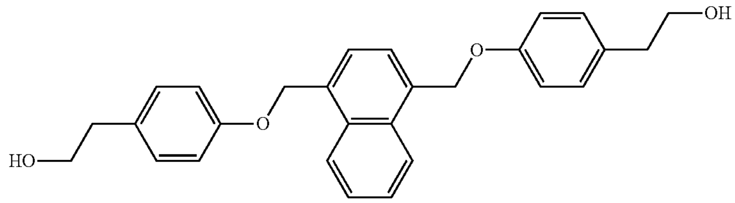
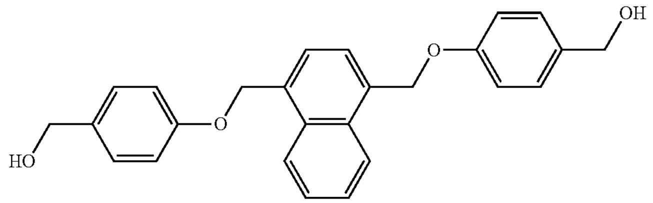
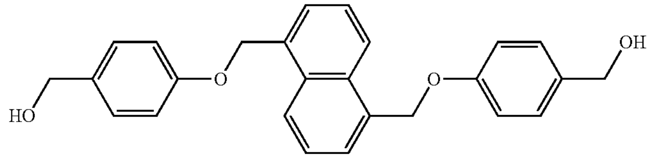
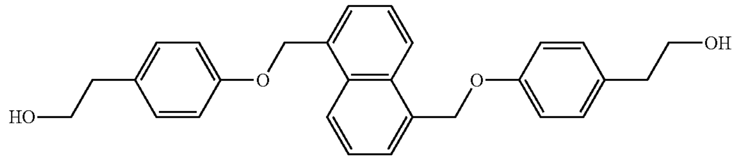

-continued
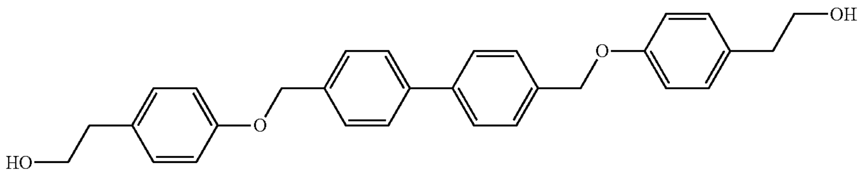
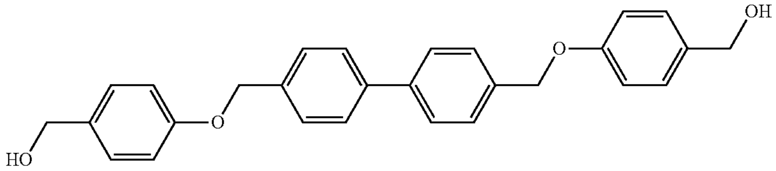
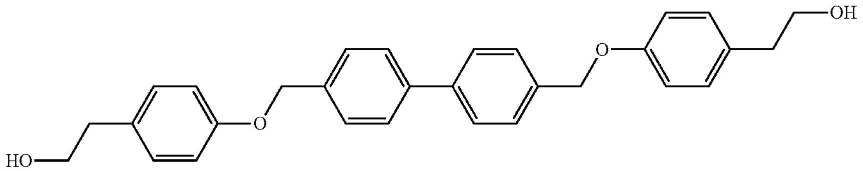
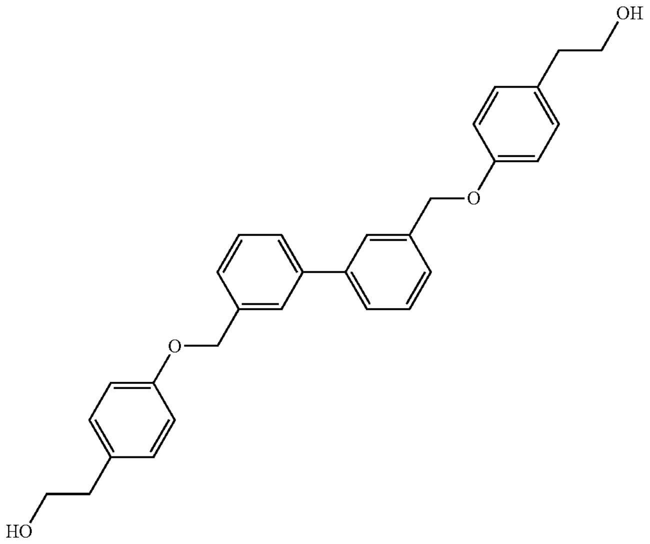
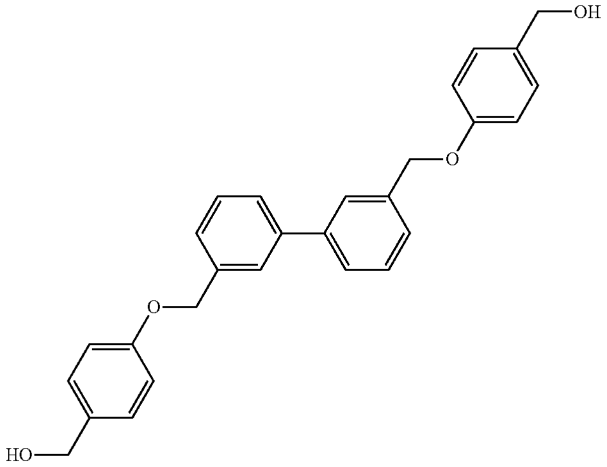

According to an exemplary embodiment of the present invention, the compound of Chemical Formula 11a may be prepared by the following reaction formula.

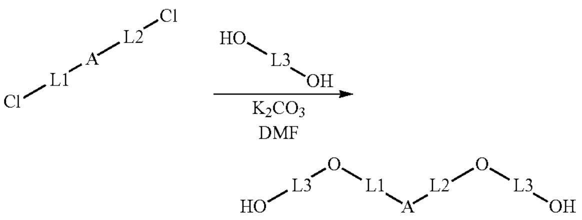

In the reaction formula, the definitions of A and L1 to L3 are the definitions in Chemical Formula 11a.

After 1 equivalent of a dichloro compound, 2.2 equivalents of a diol compound and potassium carbonate ($K_2CO_3$) are dissolved in a dimethylformamide (DMF) solvent, the resulting solution is stirred at 80° C. After the reaction is completed, extraction is performed using ethyl acetate (EA) and water, and then water is removed from the separated organic layer using anhydrous magnesium sulfate ($MgSO_4$). After the organic layer from which water has been removed is concentrated by distillation under reduced pressure, a compound of Chemical Formula 11a is synthesized by column chromatography.

The compound of Chemical Formula 11b may be prepared by a method known in the art and used, or may be used by purchasing a commercially available product.

According to an exemplary embodiment of the present invention, the carbonate precursor may be represented by the following Chemical Formula 12.

[Chemical Formula 12]

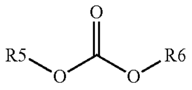

In Chemical Formula 12,

R5 and R6 are the same as or different from each other, and are each a substituted or unsubstituted straight-chained or branched alkyl, a substituted or unsubstituted cycloalkyl, a substituted or unsubstituted aryl, or a substituted or unsubstituted heteroaryl.

The carbonate precursor serves to link the compound of Chemical Formula 11a and the compound of Chemical Formula 11b, or an additional comonomer such as the compound of Chemical Formula 21, if necessary. Specific examples of Chemical Formula 12 include phosgene, triphosgene, diphosgene, bromophosgene, dimethyl carbonate, diethyl carbonate, dibutyl carbonate, dicylcohexyl carbonate, diphenyl carbonate, ditolyl carbonate, bis(chlorophenyl) carbonate, m-cresyl carbonate, dinaphthyl carbonate, bis (diphenyl) carbonate, bishaloformate, or the like, and any one of them or a mixture of two or more thereof may be used.

In an exemplary embodiment of the present specification, the carbonate precursor may be diphenyl carbonate.

A unit of the above-described Chemical Formula 1a may be formed by polymerizing the compound of Chemical Formula 11a and the carbonate precursor of Chemical Formula 12, and a unit of the above-described Chemical Formula 1b may be formed by polymerizing the compound of Chemical Formula 11b and the carbonate precursor of Chemical Formula 12.

In other words, a polycarbonate including a unit of Chemical Formula ha and a unit of Chemical Formula 1b may be prepared by polymerizing the compound of Chemical Formula 11a, the compound of Chemical Formula 11b and the carbonate precursor of Chemical Formula 12.

The compound of Chemical Formula 11a may be included in an amount of 5 wt % to 50 wt %, 10 wt % to 40 wt %, 15 wt % or more and 30 wt %, based on the total weight of the composition.

The compound of Chemical Formula 11b may be included in an amount of 20 wt % to 70 wt %, 30 wt % to 60 wt %, and 35 wt % to 50 wt %, based on the total weight of the composition.

The carbonate precursor of Chemical Formula 12 may be included in an amount of 20 wt % to 70 wt %, 30 wt % to 60 wt %, and 35 wt % to 50 wt %, based on the total weight of the composition.

For the polymerization, a method known in the art may be used, and it is desirable to perform the polymerization by melt polymerization.

Specifically, the composition including the compound of Chemical Formula 11a, the compound of Chemical Formula 11b and the carbonate precursor is melted under conditions of a pressure of 700 to 800 Torr and a temperature of 120 to 170° C. under a nitrogen atmosphere, the temperature is increased to a temperature of 180 to 200° C. under a pressure condition of 80 to 120 Torr, phenol generated during the reaction is removed, the temperature is increased to a temperature of 200° C. or more under a pressure condition of 20 to 40 Torr, the temperature is finally increased to a temperature of 220° C. or more under a pressure of 0.05 to 0.2 Torr, and then the composition can be polymerized by terminating the reaction.

In addition, in order to promote the polymerization reaction, a reaction catalyst such as lithium hydroxide, cesium carbonate, sodium hydroxide and sodium methoxide may be additionally used.

According to an exemplary embodiment of the present invention, the composition used in the polymerization step may further include a compound of the following Chemical Formula 21.

[Chemical Formula 21]

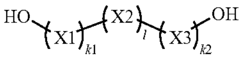

In Chemical Formula 21,

X1 and X3 are the same as or different from each other, and are each a substituted or unsubstituted divalent aliphatic hydrocarbon group, a substituted or unsubstituted divalent isosorbide group, a substituted or unsubstituted arylene, or a substituted or unsubstituted heteroarylene, X2 is a substituted or unsubstituted divalent aliphatic hydrocarbon group, a substituted or unsubstituted divalent isosorbide group, a substituted or unsubstituted arylene, a substituted or unsubstituted heteroarylene, O, S, SO, $SO_2$ or CO, k1 is 0 or 1, provided that when X2 directly bonded to X1 is O, S, SO, $SO_2$ or CO, k1 is 1, l is an integer from 1 to 5, and when l is 2 or higher, X2's are the same as or different from each other, and k2 is 0 or 1, provided that when X2 directly bonded to X3 is O, S, SO, $SO_2$ or CO, k2 is 1.

The compound of Chemical Formula 21 may be formed as the unit of the above-described Chemical Formula 2 by polymerization. The compound of Chemical Formula 21 may be included in an amount of 30 parts by mole or more, 40 parts by mole or more, 90 parts by mole or less, or 80 parts by mole or less, based on 100 parts by mole of the carbonate precursor of Chemical Formula 12.

According to an exemplary embodiment of the present invention, Chemical Formula 21 may be represented by the following Chemical Formula 31, 41, 51 or 61.

[Chemical Formula 31]

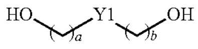

[Chemical Formula 41]

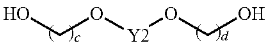

[Chemical Formula 51]

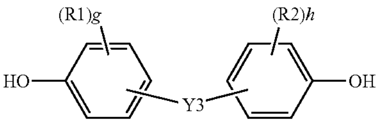

[Chemical Formula 61]

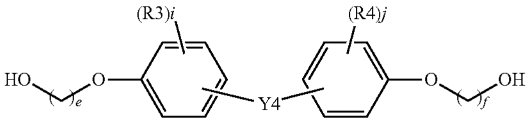

In Chemical Formulae 31, 41, 51 and 61,

Y1 and Y2 are the same as or different from each other, and are each a substituted or unsubstituted divalent aliphatic hydrocarbon group, a substituted or unsubstituted divalent isosorbide group, a substituted or unsubstituted arylene, or a substituted or unsubstituted heteroarylene, Y3 and Y4 are the same as or different from each other, and are each a substituted or unsubstituted straight-chained or branched alkylene, a substituted or unsubstituted cycloalkylene, a substituted or unsubstituted arylene, O, S, SO, $SO_2$ or CO, R1 to R4 are the same as or different from each other, and are each hydrogen, a halogen, a substituted or unsubstituted alkyl, or a substituted or unsubstituted alkoxy, a and b are each an integer from 0 to 4, c, d, e and f are each an integer from 1 to 4, g, h, i and j are each an integer from 0 to 4, and when g, h, i and j are each 2 or higher, each R1 to R4 is the same as or different from each other.

According to an exemplary embodiment of the present invention, the description in Chemical Formulae 3 to 6 may be applied to Y1 to Y4 and R1 to R4 of Chemical Formulae 31, 41, 51 and 61.

According to an exemplary embodiment of the present invention, Chemical Formula 31 may be represented by any one of the following structures.

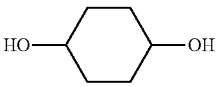

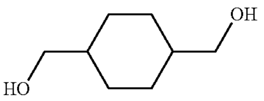

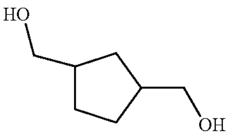

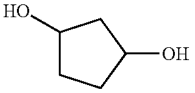

-continued

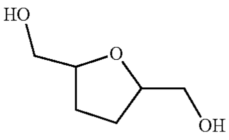

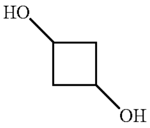

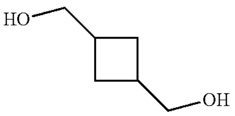

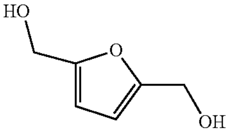

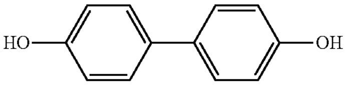

According to an exemplary embodiment of the present invention, Chemical Formula 41 may be represented by any one of the following structures.

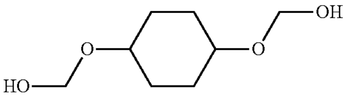

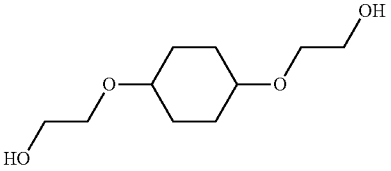

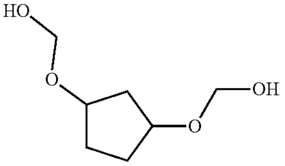

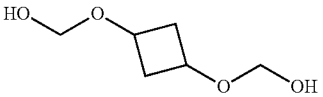

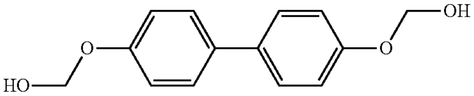

According to an exemplary embodiment of the present invention, Chemical Formula 51 may be represented by any one of the following structures.

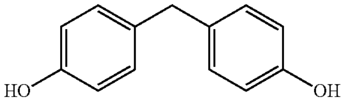

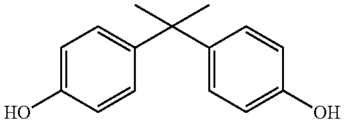

-continued

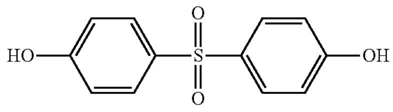

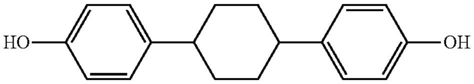

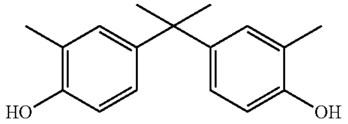

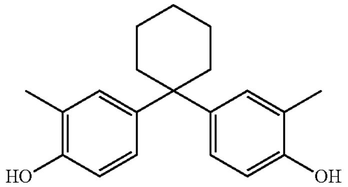

According to an exemplary embodiment of the present invention, Chemical Formula 61 may be represented by any one of the following structures.

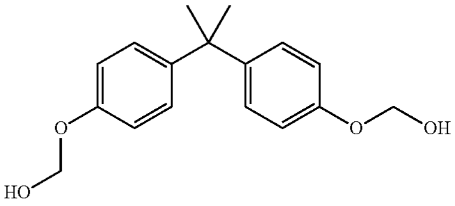

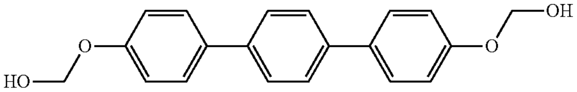

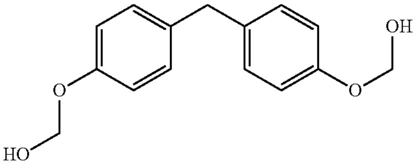

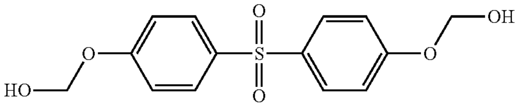

-continued

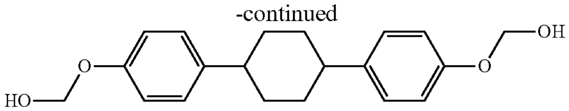

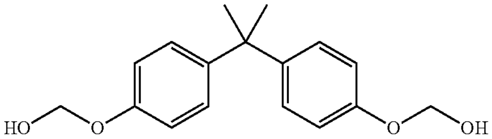

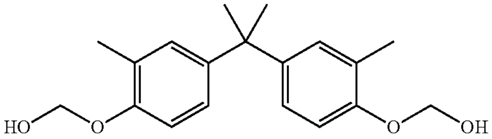

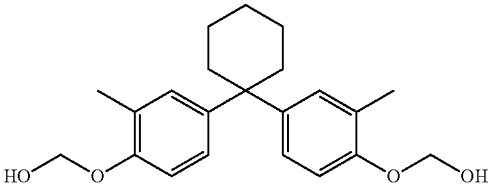

Still another exemplary embodiment of the present invention provides a composition including the polycarbonate according to the above-described exemplary embodiments.

According to an example, the composition including the polycarbonate may further include a heat stabilizer in order to prevent a decrease in molecular weight or a deterioration in color of a resin molded article.

Examples of the heat stabilizer include phosphorous acid, phosphoric acid, phosphonous acid, phosphonic acid, esters thereof, and the like, and specific examples thereof include triphenylphosphite, tris(nonylphenyl)phosphite, tris(2,4-di-tert-butylphenyl)phosphite, tridecylphosphite, trioctylphosphite, trioctadecylphosphite, didecylmonophenylphosphite, dioctylmonophenylphosphite, diisopropylmonophenylphosphite, monobutyldiphenylphosphite, monodecyldiphenylphosphite, monooctyldiphenylphosphite, bis(2,6-di-tert-butyl-4-methylphenyl)pentaerythritoldiphosphite, 2,2-methylenebis(4,6-di-tert-butylphenyl)octylphosphite, bis (nonylphenyl)pentaerythritoldiphosphite, bis(2,4-di-tert-butylphenyl)pentaerythritoldiphosphite, distearylpentaerythritoldiphosphite, tributylphosphate, triethylphosphate, trimethylphosphate, triphenylphosphate, diphenylmonoorthoxenylphosphate, dibutylphosphate, dioctylphosphate, diisopropylphosphate, 4,4'-biphenylenediphosphinic acid tetrakis(2,4-di-tert-butyl phenyl), benzenephosphonic acid dimethyl, benzenephosphonic acid diethyl, benzenephosphonic acid dipropyl or a mixture of two or more thereof.

The heat stabilizer may be used in a content of 0.0001 part by weight to 1 part by weight, 0.005 part by weight to 0.5 part by weight, or 0.01 part by weight to 0.2 part by weight, based on 100 parts by weight of the polycarbonate resin. As the stabilizer is used in the above content, it is possible to prevent a decrease in the molecular weight or discoloration of the resin without causing bleeding of the additive, and the like.

According to another example, a composition including the polycarbonate may further include a typically known antioxidant.

Specific examples of the antioxidant include pentaerythritol tetrakis(3-mercaptopropionate), pentaerythritol tetrakis (3-laurylthiopropionate), glycerol-3-stearyl thiopropionate, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl) benzene, N,N-hexamethylenebis(3,5-di-tert-butyl-4-hydroxy-hydrocinnamide), 3,5-di-tert-butyl-4-hydroxybenzylphosphonate-diethyl ester, tris(3,5-di-tert-butyl-4-hydroxybenzyl)isocyanurate, 4,4'-biphenylenediphospinic acid tetrakis(2,4-di-tert-butylphenyl), 3,9-bis{1,1-dimethyl-2-[Is-(3-tert-butyl-4-hydroxy-5-methylphenyl)propionyloxy]ethyl}-2,4,8,10-tetraoxaspiro(5,5)undecane or a mixture of two or more thereof.

The antioxidant may be used in a content of 0.0001 part by weight to 1 part by weight, 0.001 part by weight to 0.5 part by weight, or 0.005 part by weight to 0.1 part by weight, based on 100 parts by weight of the polycarbonate.

According to another example, a composition including the polycarbonate may further include a lubricant, and may include, for example, pentaerythritol tetrastearate.

The lubricant may be used in a content of 0.0001 part by weight to 1 part by weight, 0.005 part by weight to 0.5 part by weight, or 0.01 part by weight to 0.2 part by weight, based on 100 parts by weight of the polycarbonate.

Yet another exemplary embodiment of the present invention provides a molded article prepared from a composition including the polycarbonate according to the above-described exemplary embodiments. As described above, since the polycarbonate including the unit represented by Chemical Formula 1a and the unit represented by Chemical Formula 1b has excellent hardness or heat resistance, the molded article according to the present invention has a wider range of applications than molded articles prepared from a polycarbonate used in the related art. Furthermore, when the polycarbonate further includes a repeating unit represented by Chemical Formula 2, the range of applications may be further expanded because desired physical properties can be implemented by adjusting the weight ratio of the units represented by Chemical Formulae 1a, 1b and 2.

The composition or molded article may further include one or more selected from the group consisting of an antioxidant, a plasticizer, an anti-static agent, a nucleating agent, a flame retardant, a lubricant, an impact modifier, a fluorescent brightener, a UV absorber, a pigment and a dye, if necessary, in addition to the aforementioned polycarbonate.

As an example of a method of preparing the molded article, it is possible to include mixing the aforementioned polycarbonate and other additives well using a mixer, preparing the resulting mixture as a pellet by extrusion molding the mixture using an extruder, drying the pellet, and then injecting the pellet using an injection molder.

EXAMPLES

Experimental Example 1. Preparation of Polycarbonate Example 1

1) Preparation of Monomer 1 (2,2'-(((1,4-phenylenebis(methylene))bis(oxy))bis(4,1-phenylene))bis (ethan-1-ol) Monomer)

(Monomer 1)

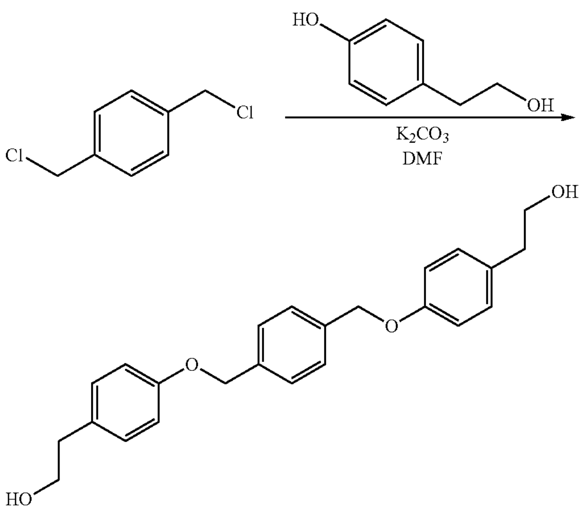

After 1 equivalent of 1,4-bis(chloromethyl)benzene, 2.2 equivalents of 4-(2-hydroxyethyl)phenol and potassium carbonate ($K_2CO_3$) were dissolved in a dimethylformamide (DMF) solvent, the resulting solution was stirred at 80° C. After the reaction was completed, extraction was performed using ethyl acetate (EA) and water, and then water was removed from the separated organic layer using anhydrous magnesium sulfate ($MgSO_4$). After the organic layer from which water had been removed was concentrated by distillation under reduced pressure, Monomer 1 was obtained by column chromatography.

2) Preparation of Polycarbonate Resin

After a reaction vessel was cleaned such that there was no moisture, nitrogen purging was performed. 105 parts by weight of diphenyl carbonate (DPC) and 40 parts by weight of Monomer 1 (compound of Chemical Formula 11a) based on 100 parts by weight of isosorbide (Roquette Freres) and 0.02 wt % (based on the weight of isosorbide) of lithium hydroxide as a catalyst were introduced into a 1 L glass reaction vessel, and the introduced materials were dissolved by stirring under conditions of a pressure of 760 Torr and a temperature of 150° C. under a nitrogen atmosphere for 20 minutes. Thereafter, the pressure was changed to 100 Torr, and phenol generated during the reaction was removed while the reaction temperature was increased to 190° C. over 60 minutes. And then, the pressure was changed to 30 Torr, and the temperature was increased to 210° C. over 40 minutes. Subsequently, as the torque of the stirrer was increased and the viscosity was increased, the pressure was finally changed to 0.1 Torr and the temperature was increased to 230° C. After the stirrer was allowed to reach the stirring torque, the reaction was terminated, and the resulting melt was pelletized to prepare a carbonate resin.

Example 2

(Monomer 2)

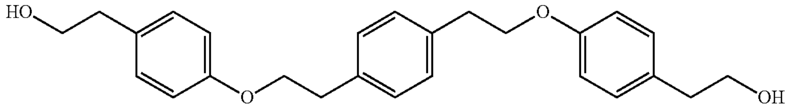

Monomer 2 was prepared in the same manner as in Example 1, except that 1,4-bis(2-chloroethyl)benzene was used instead of 1,4-bis(chloromethyl)benzene in Example 1, and a polycarbonate was prepared in the same manner as in Example 1, except that Monomer 2 was used instead of Monomer 1.

Example 3

(Monomer 3)

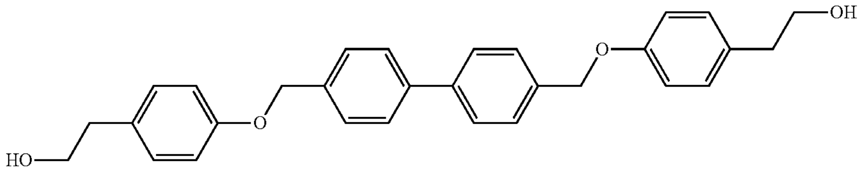

Monomer 3 was prepared in the same manner as in Example 1, except that 4,4'-bis(chloromethyl)-1,1'-biphenyl was used instead of 1,4-bis(chloromethyl)benzene in Example 1, and a polycarbonate was prepared in the same manner as in Example 1, except that Monomer 3 was used instead of Monomer 1.

Example 4

(Monomer 4)

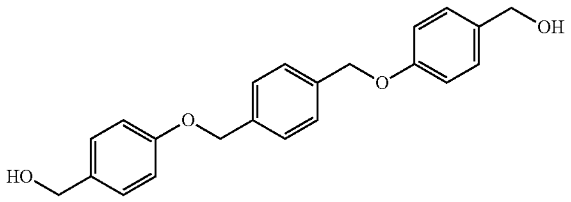

Monomer 4 was prepared in the same manner as in Example 1, except that 4-(hydroxymethyl)phenol was used instead of 4-(2-hydroxyethyl)phenol in Example 1, and a polycarbonate was prepared in the same manner as in Example 1, except that Monomer 4 was used instead of Monomer 1.

Comparative Example 1

A polycarbonate was prepared in the same manner as in Example 1 by performing the polymerization using only isosorbide except for Monomer 1 in Example 1.

Experimental Example 2. Evaluation of Physical Properties of Polycarbonate 0.050 part by weight of tris(2,4-di-tert-butylphenyl)phosphite, 0.010 part by weight of octadecyl-3-(3,5-di-tert-butyl-4-hydroxyphenyl)propionate and 0.030 part by weight of pentaerythritol tetrastearate were added to 100 parts by weight of each of the polycarbonate resins prepared in the Examples and the Comparative Examples, the resulting mixture was pelletized using HAAKE Mini CTW with a vent attached, and then a test specimen was prepared by injection molding the pellet at a cylinder temperature of 300° C. and a mold temperature of 120° C. using an HAAKE Minijet injection molding system.

The characteristics of these injection test specimens or polycarbonates were measured by the following methods, and the results are shown in Table 1.

Weight average molecular weight (g/mol): Measured by calibration with PS standard using Agilent 1200 series.

Fluidity (MI): Measured in accordance with ASTM D1238 (under conditions of 300° C., 1.2 kg).

Izod room temperature impact strength (J/m): Measured at 23° C. in accordance with ASTM D256 (1/8 inch, Notched Izod).

Pencil hardness: Measured with a pencil having a strength of 2B, B, and HB at an angle of 45 degrees under a load of 50 g in accordance with ASTM D3363 using a pencil hardness tester (Cometech) at 23° C.

TABLE 1

| | Chemical Formula 11a Compound | Chemical Formula 12a Compound | Weight average molecular weight (g/mol) | MI (g/10 min) | Impact strength (J/m) | Pencil hardness |
|---|---|---|---|---|---|---|
| Example 1 | Monomer 1 | Isosorbide | 44,000 | 13.4 | 300 | HB |
| Example 2 | Monomer 2 | Isosorbide | 43,000 | 12.0 | 280 | HB |
| Example 3 | Monomer 3 | Isosorbide | 41,000 | 13.0 | 260 | HB |
| Example 4 | Monomer 4 | Isosorbide | 42,000 | 12.1 | 250 | HB |
| Comparative Example 1 | — | Isosorbide | 35,000 | 10.3 | 240 | B |

Referring to Table 1, it was confirmed that the compounds of the Examples exhibited high impact strength and high hardness compared to the Comparative Examples.

Specifically, it could be seen that when compared to Comparative Example 1 in which the unit of Chemical Formula 1a of the present invention was not included and only the unit of Chemical Formula 1b was included, the Examples had a pencil hardness of HB while having a high impact strength of 250 J/m or more.

Therefore, it could be confirmed that the polycarbonate including both the unit of Chemical Formula 1a and the unit of Chemical Formula 1b of the present invention can achieve both improved impact resistance and high hardness.

The invention claimed is:

1. A polycarbonate comprising a unit represented by the following Chemical Formula 1a; and a unit represented by the following Chemical Formula 1b:

[Chemical Formula 1a]

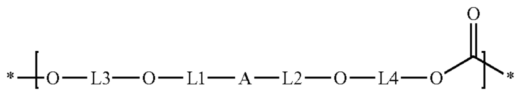

[Chemical Formula 1b]

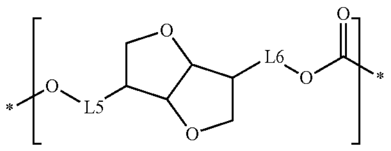

in Chemical Formulae 1a and 1b, wherein A is a substituted or unsubstituted phenylene; or an arylene in which two or more substituted or unsubstituted benzene rings are linked by a single bond or condensed, L1 and L2 are the same as or different from each other, and are each a substituted or unsubstituted straight-chained or branched alkylene, L3 and L4 are the same as or different from each other, and are each one selected from a substituted or unsubstituted straight-chained or branched alkylene, a substituted or unsubstituted cycloalkylene and a substituted or unsubstituted arylene, or a divalent group in which two or more of them are linked by a single bond, and L5 and L6 are the same as or different from each other, and are each a single bond; or one selected from a substituted or unsubstituted straight-chained or branched alkylene, a substituted or unsubstituted cycloalkylene and a substituted or unsubstituted arylene, or a divalent group in which two or more of them are linked by a single bond, units of Chemical Formula 1a included in the polycarbonate are the same as or different from each other, units of Chemical Formula 1b included in the polycarbonate are the same as or different from each other, and

* means a site linked to the main chain of the polycarbonate.

2. The polycarbonate of claim 1, wherein the polycarbonate comprises the unit represented by Chemical Formula 1a in an amount of 10 wt % to 50 wt %, based on a total weight of the polycarbonate.

3. The polycarbonate of claim 1, wherein the polycarbonate has a weight average molecular weight of 30,000 g/mol to 60,000 g/mol.

4. The polycarbonate of claim 1, wherein Chemical Formula 1a is represented by the following Chemical Formula 1a-1:

[Chemical Formula 1a-1]

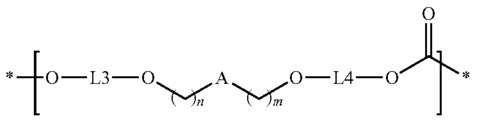

in Chemical Formula 1a-1, wherein A is a substituted or unsubstituted phenylene; or an arylene in which two or more substituted or unsubstituted benzene rings are linked by a single bond or condensed, L3 and L4 are the same as or different from each other, and are each one selected from a substituted or unsubstituted straight-chained or branched alkylene, a substituted or unsubstituted cycloalkylene and a substituted or unsubstituted arylene, or a divalent group in which two or more of them are linked by a single bond, and n and m are the same as or different from each other, and are each an integer from 1 to 20.

5. The polycarbonate of claim 4, wherein Chemical Formula 1a-1 is represented by the following Chemical Formula 1a-2:

[Chemical Formula 1a-2]

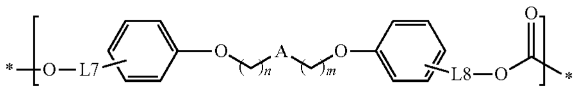

in Chemical Formula 1a-2, wherein L7 and L8 are the same as or different from each other, and are each a straight-chained or branched alkylene, and A is a substituted or unsubstituted phenylene; or an arylene in which two or more substituted or unsubstituted benzene rings are linked by a single bond or condensed, and n and m are the same as or different from each other, and are each an integer from 1 to 20.

6. The polycarbonate of claim 1, wherein A of Chemical Formula 1a is selected from the following structural formulae:

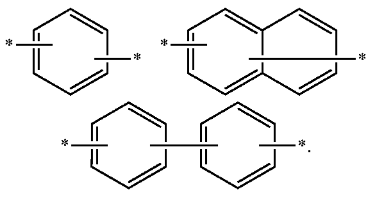

7. The polycarbonate of claim 1, wherein the polycarbonate further comprises a unit of the following Chemical Formula 2:

[Chemical Formula 2]

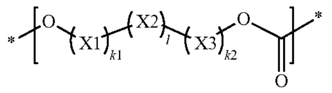

in Chemical Formula 2, wherein X1 and X3 are the same as or different from each other, and are each a substituted or unsubstituted divalent aliphatic hydrocarbon group, a substituted or unsubstituted divalent isosorbide group, a substituted or unsubstituted arylene, or a substituted or unsubstituted heteroarylene, X2 is a substituted or unsubstituted divalent aliphatic hydrocarbon group, a substituted or unsubstituted divalent isosorbide group, a substituted or unsubstituted arylene, a substituted or unsubstituted heteroarylene, O, S, SO, $SO_2$ or CO, k1 is 0 or 1, provided that when X2 directly bonded to X1 is O, S, SO, $SO_2$ or CO, k1 is 1, l is an integer from 1 to 5, and when l is 2 or higher, X2's are the same as or different from each other, k2 is 0 or 1, provided that when X2 directly bonded to X3 is O, S, SO, $SO_2$ or CO, k2 is 1, units of Chemical Formula 2 included in the polycarbonate are the same as or different from each other, and

* means a site linked to the main chain of the polycarbonate.

8. The polycarbonate of claim 7, wherein Chemical Formula 2 is represented by any one of the following Chemical Formulae 3 to 6:

[Chemical Formula 3]

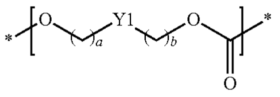

[Chemical Formula 4]

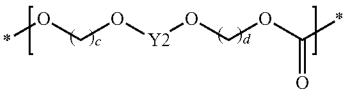

-continued

[Chemical Formula 5]

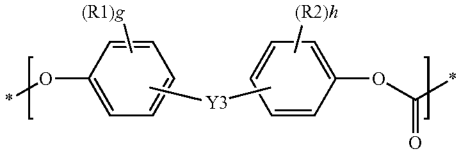

[Chemical Formula 6]

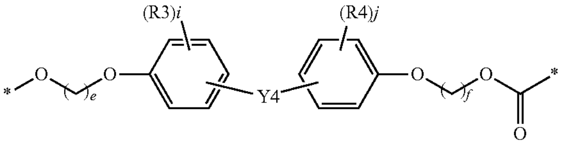

in Chemical Formulae 3 to 6, wherein Y1 and Y2 are each a substituted or unsubstituted divalent aliphatic hydrocarbon group, a substituted or unsubstituted divalent isosorbide group, a substituted or unsubstituted arylene, or a substituted or unsubstituted heteroarylene, Y3 and Y4 are each a substituted or unsubstituted straight-chained or branched alkylene, a substituted or unsubstituted cycloalkylene, a substituted or unsubstituted arylene, O, S, SO, $SO_2$ or CO, R1 to R4 are the same as or different from each other, and are each hydrogen, a halogen, a substituted or unsubstituted alkyl, or a substituted or unsubstituted alkoxy, a and b are each an integer from 0 to 4, c, d, e and f are each an integer from 1 to 4, g, h, i and j are each an integer from 0 to 4, when g, h, i and j are each 2 or higher, each R1 to R4 is the same as or different from each other, the units of Chemical Formulae 3 to 6 included in the polycarbonate are the same as or different from each other, and

* means a site linked to the main chain of the polycarbonate.

9. A method for preparing the polycarbonate according to claim 1, the method comprising:

polymerizing a composition comprising a compound of the following Chemical Formula 11a, a compound of the following Chemical Formula 11b and a carbonate precursor:

[Chemical Formula 11a]

HO—L3—O—L1—A—L2—O—L4—OH

[Chemical Formula 11b]

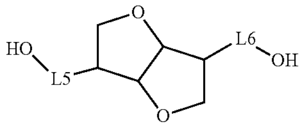

in Chemical Formulae 11a and 11b, wherein A is a substituted or unsubstituted phenylene; or an arylene in which two or more substituted or unsubstituted benzene rings are linked by a single bond or condensed, L1 and L2 are the same as or different from each other, and are each a substituted or unsubstituted straight-chained or branched alkylene, L3 and L4 are the same as or different from each other, and are each one selected from a substituted or unsubstituted straight-chained or branched alkylene, a substituted or unsubstituted cycloalkylene and a substituted or unsubstituted arylene, or a divalent group in which two or more of them are linked by a single bond, and L5 and L6 are the same as or different from each other, and are each a single bond; or one selected from a substituted or unsubstituted straight-chained or branched alkylene, a substituted or unsubstituted cycloalkylene and a substituted or unsubstituted arylene, or a divalent group in which two or more of them are linked by a single bond.

10. The method of claim 9, wherein the carbonate precursor is represented by the following Chemical Formula 12:

[Chemical Formula 12]

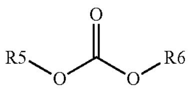

in Chemical Formula 12,

R5 and R6 are the same as or different from each other, and are each a substituted or unsubstituted straight-chained or branched alkyl, a substituted or unsubstituted cycloalkyl, a substituted or unsubstituted aryl, or a substituted or unsubstituted heteroaryl.

11. The method of claim 9, wherein the composition further comprises a compound of the following Chemical Formula 21:

[Chemical Formula 21]

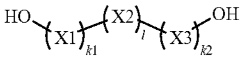

in Chemical Formula 21, wherein X1 and X3 are the same as or different from each other, and are each a substituted or unsubstituted divalent aliphatic hydrocarbon group, a substituted or unsubstituted divalent isosorbide group, a substituted or unsubstituted arylene, or a substituted or unsubstituted heteroarylene, X2 is a substituted or unsubstituted divalent aliphatic hydrocarbon group, a substituted or unsubstituted divalent isosorbide group, a substituted or unsubstituted arylene, a substituted or unsubstituted heteroarylene, O, S, SO, $SO_2$ or CO, k1 is 0 or 1, provided that when X2 directly bonded to X1 is O, S, SO, $SO_2$ or CO, k1 is 1, l is an integer from 1 to 5, and when l is 2 or higher, X2's are the same as or different from each other, and k2 is 0 or 1, provided that when X2 directly bonded to X3 is O, S, SO, $SO_2$ or CO, k2 is 1.

12. The method of claim 11, wherein Chemical Formula 21 is represented by the following Chemical Formula 31, 41, 51 or 61:

[Chemical Formula 31]

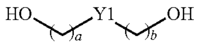

[Chemical Formula 41]

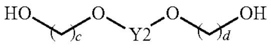

[Chemical Formula 51]

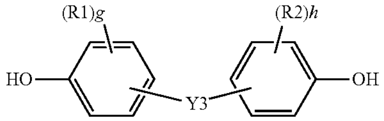

[Chemical Formula 61]

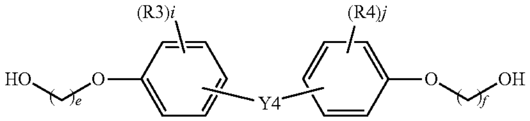

in Chemical Formulae 31, 41, 51 and 61, wherein Y1 and Y2 are the same as or different from each other, and are each a substituted or unsubstituted divalent aliphatic hydrocarbon group, a substituted or unsubstituted divalent isosorbide group, a substituted or unsubstituted arylene, or a substituted or unsubstituted heteroarylene, Y3 and Y4 are the same as or different from each other, and are each a substituted or unsubstituted straight-chained or branched alkylene, a substituted or unsubstituted cycloalkylene, a substituted or unsubstituted arylene, O, S, SO, $SO_2$ or CO, R1 to R4 are the same as or different from each other, and are each hydrogen, a halogen, a substituted or unsubstituted alkyl, or a substituted or unsubstituted alkoxy, a and b are each an integer from 0 to 4, c, d, e and f are each an integer from 1 to 4, g, h, i and j are each an integer from 0 to 4, and when g, h, i and j are each 2 or higher, each R1 to R4 is the same as or different from each other.

13. A composition comprising the polycarbonate according to claim 1.

14. A molded article prepared from a composition comprising the polycarbonate according to claim 1.

* * * * *